(12) United States Patent
Liu et al.

(10) Patent No.: US 12,737,767 B2
(45) Date of Patent: Sep. 15, 2026

(54) SAMPLING FRAMEWORK FOR IMBALANCED TRANSACTIONS

(71) Applicant: VISA INTERNATIONAL SERVICE ASSOCIATION, San Francisco, CA (US)

(72) Inventors: Can Liu, Lucas, TX (US); Yong Zhao, Austin, TX (US); Shubham Agrawal, Round Rock, TX (US); Chiranjeet Chetia, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 19/118,717

(22) PCT Filed: Nov. 1, 2023

(86) PCT No.: PCT/US2023/078378

§ 371 (c)(1),
(2) Date: Apr. 4, 2025

(87) PCT Pub. No.: WO2025/095973

PCT Pub. Date: May 8, 2025

(65) Prior Publication Data

US 2025/0265592 A1 Aug. 21, 2025

(51) Int. Cl.
*G06Q 40/00* (2023.01)
*G06N 20/00* (2019.01)
(Continued)

(52) U.S. Cl.
CPC ......... *G06Q 20/4016* (2013.01); *G06N 20/00* (2019.01); *G06Q 20/389* (2013.01)

(58) Field of Classification Search
CPC ........................... G06Q 20/4016; G06N 20/00
See application file for complete search history.

(56) References Cited

U.S. PATENT DOCUMENTS 9,129,228 B1 9/2015 Szegedy
10,346,861 B2 * 7/2019 Zhang ................ G06Q 30/0202
(Continued)

FOREIGN PATENT DOCUMENTS

| | | | | |
|---|---|---|---|---|
| CN | 112270548 | * | 1/2021 | ......... G06Q 20/4016 |
| CN | 113297378 | A | 8/2021 | |
| CN | 115661616 | A | 1/2023 | |
| KR | 10-2409019 | * | 6/2022 | ............. G06Q 40/02 |
| KR | 102409019 | B1 | 6/2022 | |
| WO | WO-2023045925 | A1 * | 3/2023 | ......... G06F 18/2415 |

OTHER PUBLICATIONS

Kim et al., "An empirical evaluation of sampling methods for the classification of imbalanced data," DOI 10.1371/journal.pone0271260, 2022 (Year: 2022).*

(Continued)

*Primary Examiner* — Abhishek Vyas
*Assistant Examiner* — William B. Bunker
(74) *Attorney, Agent, or Firm* — Kilpatrick Townsend & Stockton LLP

(57) ABSTRACT

A server computer that implements an efficient sampling technique for imbalanced transactions. Transaction data comprising unlabeled transaction data and fraudulent transaction data is encoded to form (i) a first set of encoded data associated with fraudulent transactions and unlabeled transactions that are similar to fraudulent transactions, and (ii) a second set of encoded data associated with unlabeled transactions. A first sampling process is executed with respect to the first set of encoded data to obtain a first sampled set of encoded data, and a second sampling process is executed with respect to the second set of encoded data to obtain a second sampled set of encoded data. An optimal sampling size of the transaction data is determined based on whether a performance of a machine learning model that classifies the first sampled set of encoded data and the second sampled set of encoded data satisfies a condition.

16 Claims, 12 Drawing Sheets

(51) Int. Cl.
*G06Q 20/38* (2012.01)
*G06Q 20/40* (2012.01)

(56) References Cited

U.S. PATENT DOCUMENTS

| | | | | |
|---|---|---|---|---|
| 11,645,386 | B2 * | 5/2023 | Liu | G06F 21/554 726/23 |
| 11,790,013 | B2 | 10/2023 | Wu et al. | |
| 2013/0097103 | A1 * | 4/2013 | Chari | G06N 20/10 707/E17.089 |
| 2015/0025846 | A1 * | 1/2015 | Klein | G06F 17/18 702/179 |
| 2020/0050662 | A1 * | 2/2020 | Bhat | G06F 18/211 |
| 2020/0175418 | A1 * | 6/2020 | Pham | G06F 16/24573 |
| 2021/0390385 | A1 * | 12/2021 | Saleh | G06N 3/084 |
| 2022/0027920 | A1 | 1/2022 | Kreth et al. | |
| 2022/0156649 | A1 * | 5/2022 | Mohan | G06N 3/082 |
| 2022/0172105 | A1 * | 6/2022 | Nia | G06F 18/211 |
| 2022/0374410 | A1 * | 11/2022 | Tepper | G06N 20/00 |
| 2022/0383322 | A1 * | 12/2022 | Butvinik | G06N 20/20 |
| 2023/0076083 | A1 * | 3/2023 | Mishra | G06F 18/2148 |
| 2023/0350880 | A1 * | 11/2023 | Shreve | G06F 16/2379 |
| 2023/0385836 | A1 * | 11/2023 | Hughes | G06Q 20/4016 |
| 2023/0419402 | A1 * | 12/2023 | Ghelichi | G06N 5/01 |
| 2025/0087313 | A1 * | 3/2025 | O'Conchuir | G16H 10/20 |

OTHER PUBLICATIONS

Di et al., "An Adaptive Pre-clustering Support Vector Machine for Binary Imbalanced Classification," IEEE International Conference on Systems, Man, and Cybernetics, 2018 (Year: 2018).*

Cao et al., "Imbalanced Data Classification Using Improved Clustering Algorithm and Under-sampling Method," 20th International Conference on Parallel and Distributed Computing Applications and Technologies, 2019 (Year: 2019).*

The AI Data Engine for Computer Vision & Generative AI, Available Online at: https://www.v7labs.com/, Accessed from Internet on Aug. 9, 2023, 11 pages.

Application No. PCT/US2023/078378 , International Search Report and Written Opinion, Mailed On Jul. 24, 2024, 9 pages.

"Flying Bird Machine Learning: Learning Curve Overfitting And Underfitting", https://blog.csdn.net/m0_37870649/article/details/79810542, Apr. 3, 2018, 22 pages.

Application No. CN202380076583.3 , Office Action, Mailed On Aug. 16, 2025, 16 pages.

Liu et al., "Credit Card Fraud Detection Based on KM-SVMSMOTE-CNN", Computer Systems and Applications, Jun. 30, 2022, pp. 361-367.

Application No. CN202380076583.3 , Office Action, Mailed On Feb. 12, 2026, 15 pages.

Application No. CN202380076583.3, Office Action, Mailed on Jun. 7, 2026, 20 pages.

* cited by examiner

| SENDER | RECEIVER | AMOUNT | FEATURE 1 | FEATURE 2 | FEATURE 3 |
|---|---|---|---|---|---|
| ROBERT | JAMES | $300 | 4 | $952.05 | 5 |

| SENDER | RECEIVER | AMOUNT | FEATURE 1 | FEATURE 2 | FEATURE 3 |
|---|---|---|---|---|---|
| ROBERT | JAMES | $100 | 4 | $952.05 | 5 |
| ROBERT | KEVIN | $50 | 2 | $98.56 | 6 |
| CATHY | ROBERT | $100 | 0 | 0 | 1 |
| ROBERT | JOHN | $70 | 3 | $100 | 8 |

SAMPLING FRAMEWORK FOR IMBALANCED TRANSACTIONS

This application is a 371 application which claims priority to PCT Application No. PCT/US2023/078378 filed Nov. 1, 2023, which is herein incorporated by reference in its entirety for all purposes

BACKGROUND

With the recent proliferation in data, organizations continue to take considerable efforts to process and manage the data. End-user applications, increasing network bandwidths, technological developments in communication devices e.g., mobile devices are some of the factors that contribute to the proliferation of data. Training data is one such type of data that is a crucial component in building machine learning models. Training data corresponds to a dataset that is used to teach the model to make predictions or classifications based on input data. The quality and quantity of training data have a significant impact on the performance of the machine learning model.

The size of training datasets in various fields, especially in machine learning and artificial intelligence, has been a subject of ongoing discussion and change. The trends in training dataset sizes can vary depending on the specific application. However, there has been a general trend towards using larger and larger datasets for training machine learning models. This trend is partly driven by the availability of more data, advances in data collection methods, and a belief that larger datasets can lead to more accurate and robust models.

While large training datasets are often beneficial for improving the performance and generalization of machine learning models, they come with several drawbacks and challenges. For instance, collecting, cleaning, and labeling a large dataset can be expensive and time-consuming. Large datasets require significant storage capacity, which can lead to high storage costs. Transferring such datasets to cloud platforms or across networks can also be time-consuming and expensive. Furthermore, training on large datasets demands powerful hardware, which can be costly. The need for more powerful processors (e.g., graphical processing units) can be a limiting factor for smaller organizations or researchers with limited resources. Additionally, training on large datasets can be time-consuming, taking days or even weeks to complete. Such factors can hinder the rapid development and experimentation with models. Embodiments of the invention address these and other problems individually and collectively.

BRIEF SUMMARY

Embodiments provide for an efficient sampling technique/framework for imbalanced transactions.

One embodiment includes a method including: encoding, by a server computer, transaction data comprising unlabeled transaction data and fraudulent transaction data, the encoding forming encoded transaction data comprising: (i) a first set of encoded data associated with fraudulent transactions and unlabeled transactions that are similar to fraudulent transactions, and (ii) a second set of encoded data associated with unlabeled transactions; performing, by the server computer, a first sampling process with respect to the first set of encoded data to obtain a first sampled set of encoded data; performing, by the server computer, a second sampling process with respect to the second set of encoded data to obtain a second sampled set of encoded data; evaluating, by the server computer, a performance of a machine learning model that classifies the first sampled set of encoded data and the second sampled set of encoded data; and responsive to the performance of the machine learning model not satisfying a condition, repeating by the server computer, the first sampling process and the second sampling process by increasing a size of the first sampled set of encoded data and the second sampled set of encoded data, until the condition is satisfied.

Another embodiment includes a server computer comprising: a processor; and a non-transitory computer readable medium coupled to the processor and comprising code, executable by the processor, for implementing a method comprising: encoding transaction data comprising unlabeled transaction data and fraudulent transaction data, the encoding forming encoded transaction data comprising: (i) a first set of encoded data associated with fraudulent transactions and unlabeled transactions that are similar to fraudulent transactions, and (ii) a second set of encoded data associated with unlabeled transactions; performing a first sampling process with respect to the first set of encoded data to obtain a first sampled set of encoded data; performing a second sampling process with respect to the second set of encoded data to obtain a second sampled set of encoded data; evaluating a performance of a machine learning model that classifies the first sampled set of encoded data and the second sampled set of encoded data; and responsive to the performance of the machine learning model not satisfying a condition, repeating by the server computer, the first sampling process and the second sampling process by increasing a size of the first sampled set of encoded data and the second sampled set of encoded data, until the condition is satisfied.

Further details regarding embodiments of the invention can be found in the Detailed Description and the Figures.

DETAILED DESCRIPTION

Figure 1:
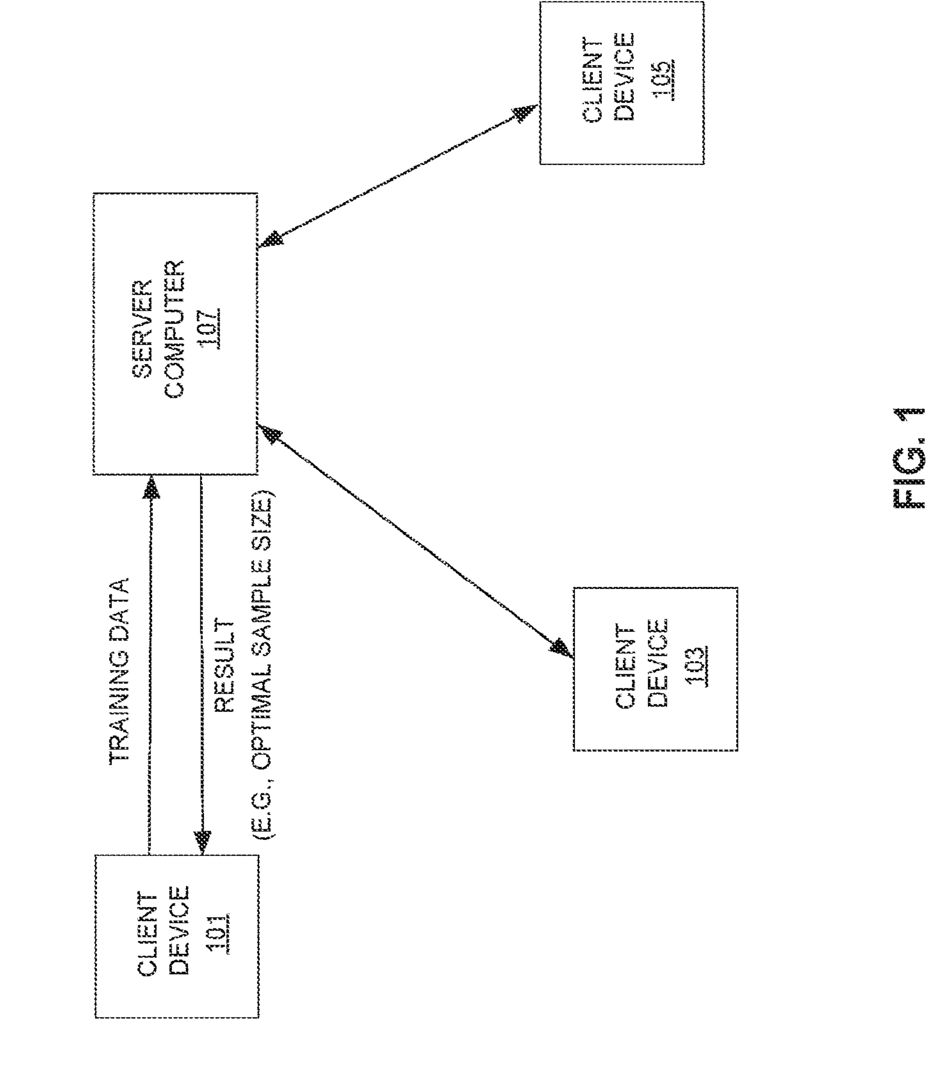
FIG. 1 shows a high-level block diagram of an interaction system according to some embodiments.

Prior to discussing embodiments of the invention, some terms can be described in further detail.

"Transaction data" can refer to information or records generated as a result of a transaction (e.g., financial, or non-financial transactions) between parties or entities. Transaction data typically includes details about the exchange of goods, services, or financial assets. For instance, transaction data may include any suitable data corresponding to a transaction such as account information for a payment account (e.g., a PAN, payment token, expiration date, card verification values (e.g., CVV, CVV2), dynamic card verification values (dCVV, dCVV2), an identifier of an issuer with which an account is held) etc.

A "credential" may be any suitable information that serves as reliable evidence of worth, ownership, identity, or authority. A credential may be a string of numbers, letters, or any other suitable characters that may be present or contained in any object or document that can serve as confirmation.

A "token" may be a substitute value for a credential. A token may be a string of numbers, letters, or any other suitable characters. Tokens may be generated as hash values by inputting the credential to a cryptographic hash function. Examples of tokens include access tokens such as payment tokens, data that can be used to access secure systems or locations, etc.

"Payment credentials" may include any suitable information associated with an account (e.g., a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

A "server computer" is typically a powerful computer or cluster of computers. For example, the server computer can be a large mainframe, a minicomputer cluster, or a group of servers functioning as a unit. In one example, the server computer may be a database server coupled to a Web server.

"Encoding" corresponds to the process of converting data from one format or representation to another. Such a conversion is often done for various purposes, such as data compression, data security, or ensuring that data is compatible with a specific system or application. An "encoder" is a device, algorithm, or component that performs the task of encoding, which involves converting information or data from one format or representation into another. In the present disclosure, data corresponding to a transaction can be encoded and represented as a vector in an N-dimensional (e.g., N=5 dimensional) vector space.

"Sampling" can refer to a process of selecting a subset of data points or observations from a larger population or dataset for the purposes of analysis, modeling, or making inferences about an entire population. Sampling is a technique used when it may be impractical or unfeasible to collect and process data from an entire population. A "sampling method" or a "sampling process" is a procedure used to select individuals or data points from the population to form the sample, whereas a "sample size" is the number of data points or individuals selected for the sample.

A "hard-negative sampling" process can include a first sampling process performed by a first sampling module. Hard negative sampling may be considered as a variant of negative sampling and contrastive learning and is useful in scenarios where there is an imbalance between the number of positive and negative samples, thereby make it challenging to train a model effectively. The goal of hard negative sampling is to focus the model's training (e.g., sampling) on the most challenging or informative negative examples, thereby improving the model's ability to distinguish between positive and negative instances, ultimately leading to better classification performance.

A "diversity sampling" process can include a second sampling process performed by a second sampling module. Diversity sampling is a data sampling technique that focuses on selecting a diverse subset of data points from a larger dataset. The goal of diversity sampling is to ensure that the selected subset contains a wide range of representative examples that cover various aspects of the data distribution. Specifically, diversity sampling aims to improve the quality of the selected subset and prevent overrepresentation of specific patterns or categories.

A "fraudulent transaction", also known as a fraudulent activity or fraudulent operation, can be an unauthorized or deceptive transaction that is carried out with the intent to deceive, gain an unfair advantage, or commit an illegal act. Fraudulent transactions can occur in various contexts, such as banking, online commerce, insurance, credit card transactions, and more. Data corresponding to the fraudulent transaction is referred to herein as "fraudulent transaction data".

"Training data" can be used in building machine learning models. Training data corresponds to a dataset that is used to teach the model to make predictions or classifications based on input data. It is noted that the quality and quantity of training data may have a significant impact on the performance of the machine learning model.

"Model training" or "Machine learning training" corresponds to a process where a machine learning algorithm or model learns from data to make predictions or perform a specific task. It involves presenting a model with a dataset that includes input features and corresponding target outputs (also called labels), and the model learns to make predictions or classifications by adjusting its internal parameters.

"Unlabeled data", in the context of machine learning and data analysis, refers to a dataset in which the individual data points or instances do not have associated labels or target values. In other words, the data does not have explicit annotations or categories assigned to each observation. Unlabeled data is distinct from labeled data, which includes data with predefined target values or classifications.

"Imbalanced transactions" can refer to a situation in which there is a significant disparity in the number or value of transactions between different categories or classes within a dataset. Such an imbalance can occur in various contexts, including financial transactions, fraud detection, healthcare, and more. It is noted that addressing imbalanced transactions is important in machine learning because it can lead to biased models.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "user" may include an individual. In some embodiments, a user may be associated with one or more personal accounts and/or user devices.

FIG. 1 shows a block diagram of an interaction system 100 according to an embodiment. The interaction system 100 includes one or more user devices e.g., client devices 101, 103, and 105, and a server computer 107. In some implementations, the server computer 107 may host a machine learning model and be configured for training the machine learning model based on training data received from different data sources (e.g., client device 101). Training data is a crucial component in building machine learning models. Training data corresponds to a dataset that is used to teach the model to make predictions or classifications based on input data. The quality and quantity of training data have a significant impact on the performance of the machine learning model. The trends in training dataset sizes can vary depending on the specific application(s). However, there has been a general trend towards using larger and larger datasets for training machine learning models.

While large training datasets are often beneficial for improving the performance and generalization of machine learning models, they come with several drawbacks and challenges as described previously. According to some embodiments, the server computer 107 is configured to determine an optimum size of the training data set without comprising on the performance of the machine learning model. As will be discussed below, the server computer implements different data sampling processes to obtain a significantly smaller size of input training data. It is appreciated that the server computer 107, while lowering the size of the input data sets (i.e., training data) ensures that different sample variations in the input data set are accounted for in evaluating the performance of the machine learning model.

The functionalities of the server computer 107 described herein can be applicable to different transactions e.g., credit card transactions which are extremely imbalanced. Specifically, data associated with credit card transactions (also referred to herein as transaction data) is highly imbalanced in the sense that most transactions (e.g., normal transactions) have similar patterns i.e., similar characteristics, while fraudulent transactions have abnormal behaviors (i.e., different characteristics). Thus, by some embodiments, the server computer 107 generates different data sets based on the training data received from the different client devices—i.e., generates a first set of normal transactions and implements a first sampling process (e.g., diversity sampling) to sample data covering a variety of normal transactions. In doing so, the server computer ensures that performing sampling of normal transactions does not hurt (i.e., negatively impact) the performance of the machine learning model.

Further, the server computer 107 generates a second set of data corresponding to normal transactions that have similar behavior (i.e., characteristics) as fraudulent transactions. A second sampling process is implemented on the generated second set of data. This enables the server computer to distinguish fraudulent patterns in transaction data from the normal transactions. As depicted in FIG. 1, an output of the server computer may correspond to an optimal size of training data (e.g., a reduced training data size) that can be utilized to train machine learning models, without incurring a significant impact on their performance. Details pertaining to the server computer 107 are described next with reference to FIG. 2A-FIG. 10B.

Figure 2:
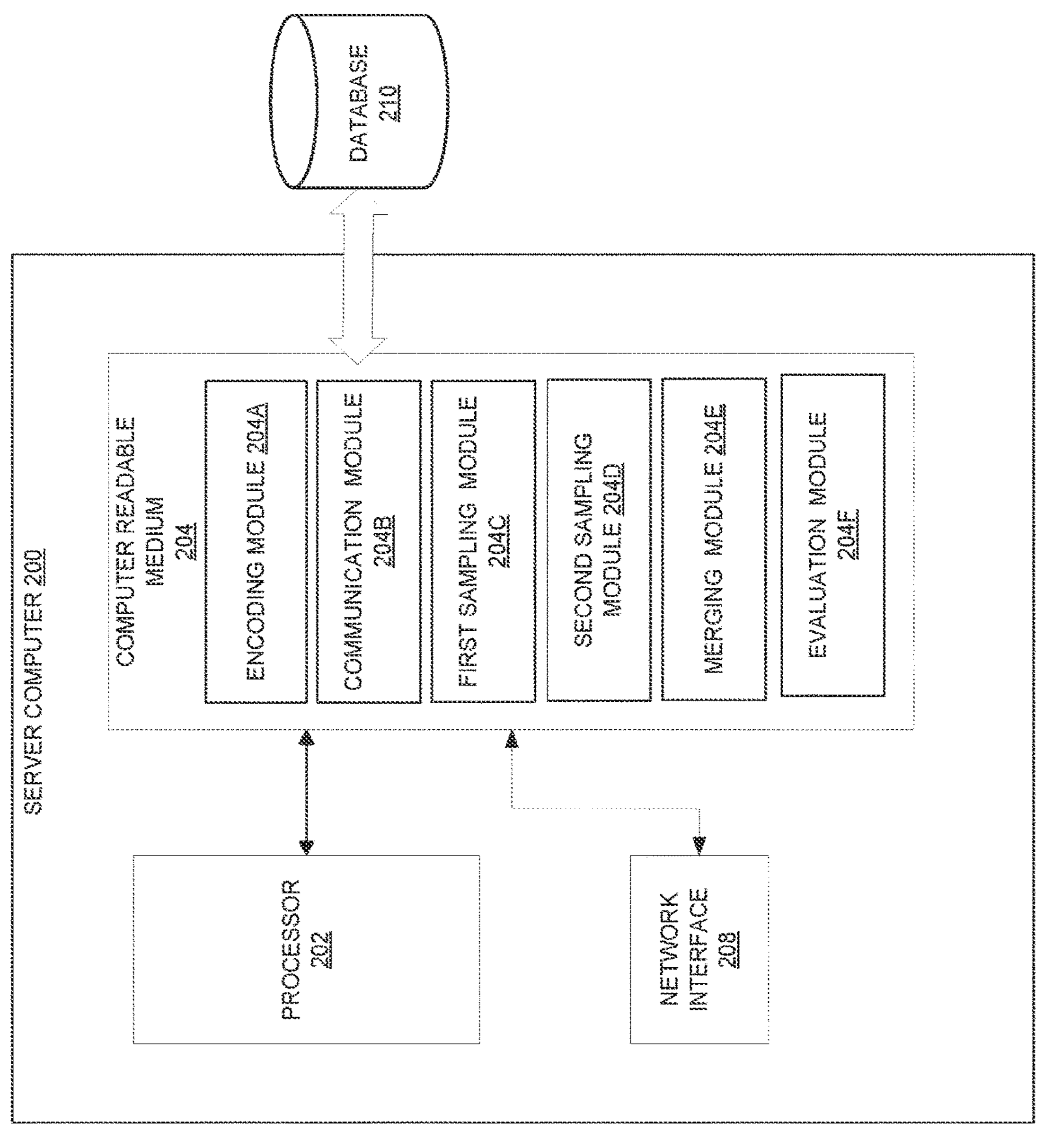
FIG. 2 shows a block diagram of a server computer according to an embodiment.

FIG. 2 depicts a server computer 200. By some embodiments, the server computer 200 of FIG. 2 corresponds to the server computer 107 of FIG. 1. The server computer 200 includes a processor 202, a computer readable medium 204, and a network interface 208.

The computer readable medium 204 may comprise an encoding module 204A, a communications module 204B, a first sampling module 204C, a second sampling module 204D, a merging module 204E, and an evaluation module 204F. The communication module 204B may comprise code that causes the processor 202 to generate messages, forward messages, reformat messages, and/or otherwise communicate with other entities. Specifically, the communication module 204B may include a variety of communications means e.g., short range antennas, long range antennas, etc., to communicate with other devices e.g., user or client devices 101, 103, and 105 of FIG. 1.

By some embodiments, the communications module 204B may include one or more RF transceivers and/or connectors that can be used by the server computer 200 to communicate with other devices and/or to connect with external networks. The short range antennas of the communications module 204B may be configured to communicate with external entities through a short range communication medium (e.g., using Bluetooth, Wi-Fi, infrared, NFC, etc.). The long range antennas of the communication module 204B may be configured to communicate with a remote base station and a remote cellular or data network, over the air. An instance of a communication channel formed by the server computer 200, may be a communication channel formed with the user device e.g., client devices 101, 103, and 105 depicted in FIG. 1. In such a communication channel, the client devices may be programmed to transmit to the server computer 200, training data that is used to train a specific machine learning model. In response, the server computer 200 may perform processing as described next with references to FIG. 3 to FIG. 10B to determine an optimal sample size of the training data that can be utilized by the client devices. In some embodiments, the server computer 200 may be configured to not only determine the optimal size of training data but also to train the machine learning model. Outputs from the server computer 200 may be transmitted to each client device (e.g., client device 101 of FIG. 1) utilizing the communication module 204B.

The encoding module 204A is a component or a layer of a model that is responsible for encoding or extracting essential information from input data. Specifically, the encoding module 204A corresponds to an encoder that transforms raw input data (e.g., transaction data) into a more compact and meaningful representation (e.g., an N-dimensional vector representation in a vector space) that is suitable for subsequent processing or analysis. Such an encoded representation may have reduced dimensionality and focuses on capturing the salient features of the input data, which can be useful for tasks like classification, clustering, or generating reconstructions of the original data.

The first sampling module 204C and the second sampling module 204D correspond to components of the server computer 200 that are each configured to extract or select a subset of items or data points from a larger set of data points. It is appreciated that the first sampling module 204C as well the second sampling module 204D may correspond to a device, component, or process that perform the task of selecting or extracting items or data points from the larger set of data points, often with an element of randomness or selection criteria involved. The selection criteria corresponds to a process implemented by a sampling module in generating the subset of data points from the larger set of data points. For instance, in some implementations, the first sampling module 204C may implement a first sampling process (e.g., hard-negative sampling), whereas the second sampling module 204D may implement a second sampling process (e.g., diversity sampling) that is different from the first sampling process. Details pertaining to the first sampling process performed by the first sampling module 204C are described in detail with reference to FIG. 6 and FIGS. 7A-7C, whereas details pertaining to the second sampling process performed by the second sampling module 204D are described in detail with reference to FIGS. 8 and 9. It is appreciated that although the server computer 200 is depicted as including two separate sampling modules (that each perform a unique sampling process), this is in no way limiting the scope of the present disclosure. For instance, the server computer 200 may include a single sampling module that is configured to perform different sampling processes with respect to different input data sets.

The merging module 204E of the server computer 200 is a component that is configured to generate a merged data set (e.g., a concatenated data set) from the outputs generated by the first sampling module 204C and the second sampling module 204D. Specifically, in some embodiments, the first sampling module 204C generates a first sampled set of data (i.e., a first set including a first plurality of data points) and the second sampling module 204D generates a second sampled set of data (i.e., a second set including a second plurality of data points). The merging module 204E is configured to generate a concatenated set that includes all elements (data points) included in the first sampled set of data as well as the second sampled data i.e., the merged set includes the first plurality of data points and the second plurality of data points.

The evaluation module 204F of the server computer 200 is programmed to assess (i.e., evaluate) a machine learning model's performance to determine how well the model can make predictions or classifications on new, unseen data. The evaluation process helps one understand the model's strengths, weaknesses, and suitability for a particular task. In some implementations, common metrics and techniques may be used to assess a model's performance, and the choice of evaluation method depends on the type of machine learning tasks, such as classification, regression, or clustering.

In some embodiments, the evaluation module 204E is configured to evaluate the performance of the machine learning model in an iterative manner. Specifically, with a goal of obtaining an optimal sample size of input data, the evaluation module 204F, obtains, for a first sample size of the input data, a performance (e.g., first performance) of the machine learning model. The evaluation module 204F further determines whether the first performance satisfies some pre-defined condition. In response to determining that the first performance does not satisfy the pre-defined condition, the evaluation module 204F is configured to repeat another evaluation process (i.e., another iteration of evaluating the machine learning model) with an increased sample size of input data. Details pertaining to the iterative evaluation of the machine learning model is described later with reference to FIGS. 10A and 10B. It is noted that the server computer 200 may be associated with a database 210. The server computer may utilize the database 210 for purposes of storing data obtained from the encoding module (i.e., encoded data), from the first/second sampling module (i.e., sampled data sets), from the merging module (i.e., merged data set), and/or data obtained from the evaluation module (i.e., performance of the machine learning model).

Figure 3:
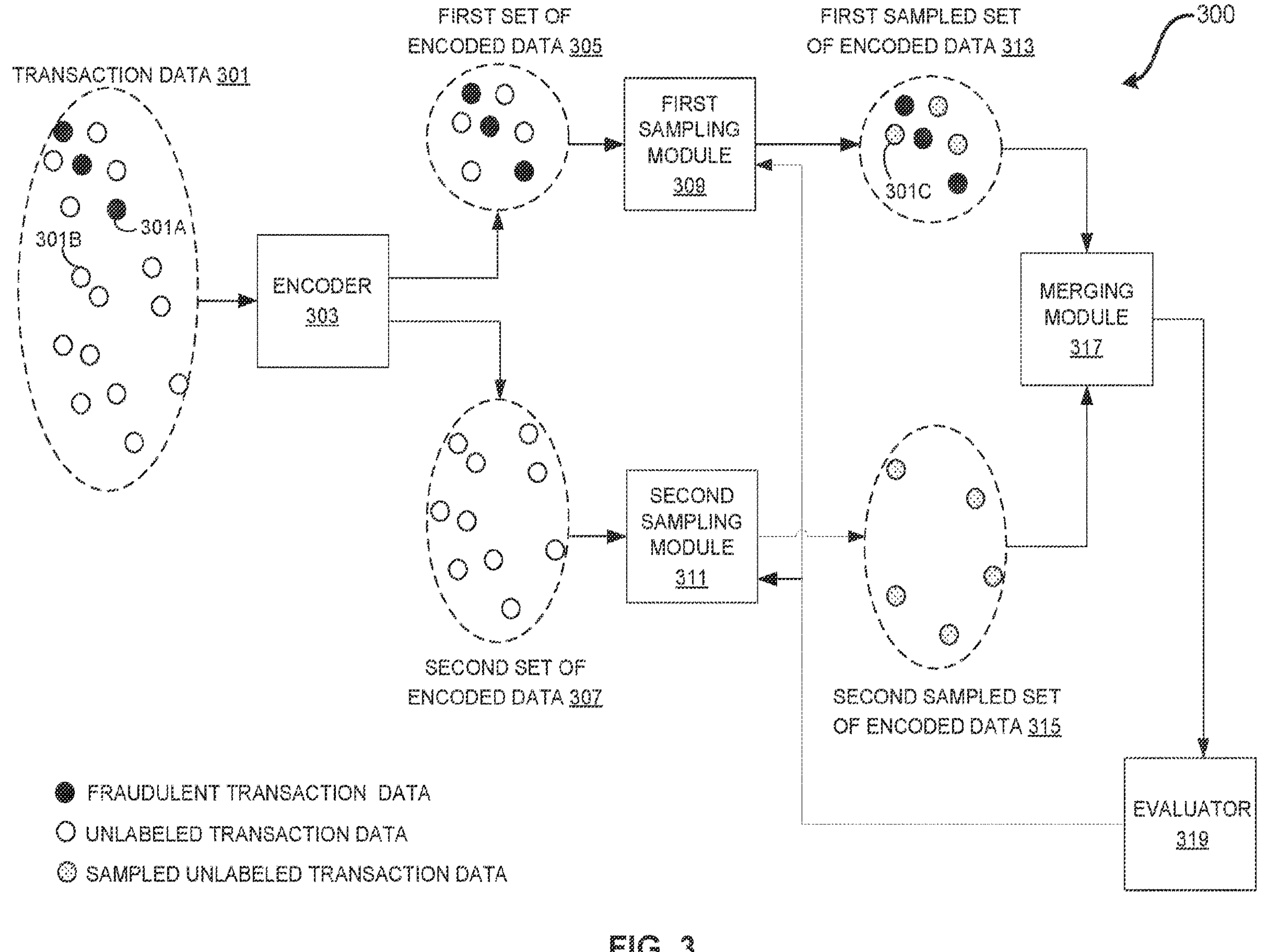
FIG. 3 depicts a sampling framework implemented by a server computer according to an embodiment.

FIG. 3 depicts a sampling framework implemented by a server computer (e.g., server computer 200 of FIG. 2) according to an embodiment. As shown in FIG. 3, the sampling framework 300 includes an encoder 303, a first sampling module 309, a second sampling module 311, a merging module 317, and an evaluation module or evaluator 319. It is noted that the above listed components/modules are included in the server computer 200 of FIG. 2.

Figures 4A, 4B:
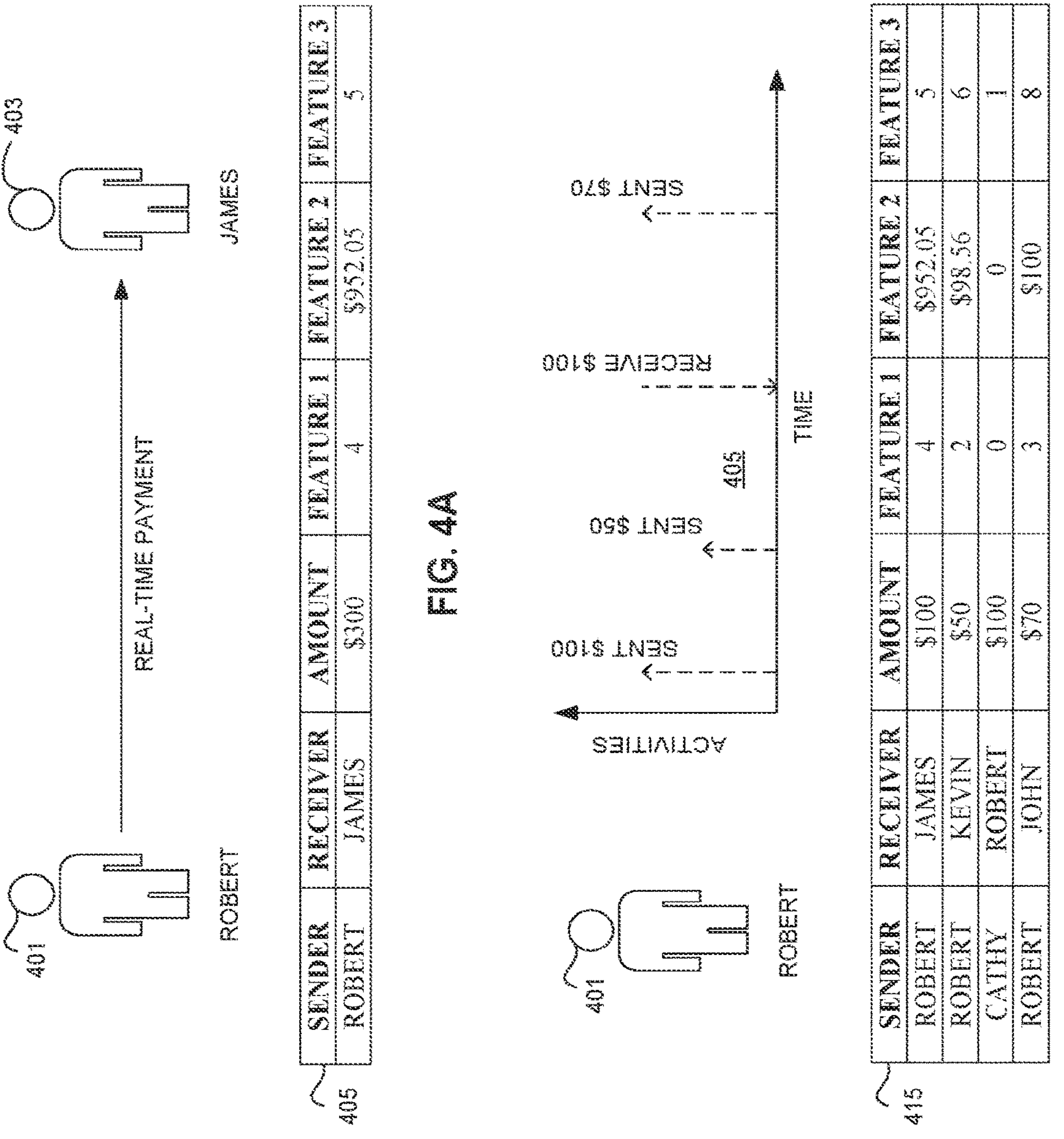
FIGS. 4A and 4B depict different types of transactions according to some embodiments.

The input to the encoder 303 is transaction data 301. The transaction data 301 corresponds to fraudulent transactions and unlabeled transactions. It is noted that such transaction data 301 may be obtained from different data sources as described previously with reference to FIG. 1. Specifically, transaction data 301 includes a plurality of data points (also referred to herein as transaction data points) including-one or more fraudulent transaction data points (e.g., fraudulent transaction data point 301A) that corresponds to a known fraudulent transaction and one or more unlabeled transaction data points (e.g., unlabeled transaction data point 301B) that corresponds to some transaction. The encoder 303 is configured to convert information or data from one format or representation into another. For example, the encoder 303 may receive transaction data 301 in one format (e.g., a plaintext vector/matrix format as shown in FIGS. 4A and 4B) and encode each transaction data point included in the transaction data to a vector (e.g., N-dimensional vector) that is represented in a N-dimensional vector space.

By some embodiments, the encoder 303 encodes the transaction data 301 based on a contrastive learning approach. Specifically, a goal of contrastive learning is to learn meaningful representations of data by training the encoder to distinguish between pairs of data points or to separate positive examples (pairs that should be similar) from negative examples (pairs that should be dissimilar). It is noted that the contrastive learning approach does not require labeled data for supervised learning. Rather, it leverages the inherent structure and similarities within the data to learn useful representations. As shown in FIG. 3, the encoder 303 generates two sets of encoded data-a first set of encoded data 305 and a second set of encoded data 307. The first set of encoded data 305 is associated with fraudulent transactions and unlabeled transactions that are 'similar' to fraudulent transactions. In other words, the first set of encoded data includes encoded fraudulent transaction data points (represented as bold circles) and encoded unlabeled transaction data points (represented as non-bolded circles). The second set of encoded data 307 is associated with unlabeled transactions i.e., the second set of encoded data includes one or more encoded unlabeled transaction data points. Details pertaining to the operations performed by the encoder 303 as well as concepts related to an unlabeled transaction data point (corresponding to an unlabeled transaction) being 'similar' to fraudulent transaction data points (corresponding to the fraudulent transactions) are described later with reference to FIGS. 5A and 5B.

The first set of encoded data 305 is input to the first sampling module 309, whereas the second set of encoded data is input to the second sampling module 311. According to some embodiments, the first sampling module 309 executes a first sampling process (e.g., a hard negative sampling process) to generate the first sampled set of encoded data 313. The second sampling module 311 executes a second sampling process (e.g., a diversity sampling process) to generate the second sampled set of encoded data 315. As shown in FIG. 3, for sake of illustration, the transaction data 301 is depicted as including a total of 17 data points i.e., 3 fraudulent transaction data points (represented by solid circles) and 14 unlabeled transaction data points (represented by empty circles). The encoder 303 generates the two sets of encoded data i.e., the first set of encoded data 305 comprising the 3 fraudulent transaction data points and 4 unlabeled transaction data points (that are 'similar' to fraudulent transactions), and the second set of encoded data 307 comprising the other 10 unlabeled transaction data points.

The first sampling module 309 generates the first sampled set of encoded data 313 by sampling the first set of encoded data 305. Similarly, the second sampling module 311 generates the second sampled set of encoded data 315 by sampling the second set of encoded data 307. In some implementations, the first sampling module 309 is configured to sample/select all the fraudulent transaction data points (i.e., the points represented by solid circles in encoded data set 305) and sample one or more unlabeled transaction data points (that are similar to fraudulent transactions) from the encoded set 305. The sampled one or more unlabeled transaction data points that are similar to fraudulent transactions are represented by shaded circles e.g., shaded data point 301C. In the example depicted in FIG. 3, the first sampling module 309 samples 3 (out of a total of 4) unlabeled transaction data points to be included in the first sampled set of encoded data 313. In a similar manner, the second sampling module 311 is depicted as selecting/sampling 5 unlabeled transaction data points (of a total of 10 unlabeled transaction data points) from the second set of encoded data 307 to form the second sampled set of encoded data 315.

In some implementations, the generated first sampled set of encoded data 313 and the second sampled set of encoded data 315 are input to the merging module 317. The merging module 317 generates a concatenated (or combined) data set, which includes samples or data points included in the first sampled set of encoded data 313 and the second sampled set of encoded data 315.

The combined data set that is generated by the merging module 317 may be input to the evaluator 319. In some implementations, the evaluator 319 is configured to evaluate a performance of a machine learning model that classifies data points included in the concatenated data set i.e., the first sampled set of encoded data and the second sampled set of encoded data. The evaluator 319 determines whether the performance of the machine learning model satisfies a condition. Based on the condition being unsatisfied, the evaluator 319 triggers the first sampling module 309 and the second sampling module 311 to respectively increase a sample size of the first sampled set of encoded data 313 and the second sampled set of encoded data 315 in order to perform another round (i.e., iteration) of evaluating the performance of the model. In this manner, the evaluator 319 repeatedly performs model evaluation (with an increased sample size of the first and second sampled sets of encoded data) until the condition is satisfied. Upon the condition being satisfied, the evaluator 319 concludes the evaluation of the machine learning model and outputs the sample size of the first and second sampled sets of data as being the optimal sample size (e.g., an overall sample size) with respect to the transaction data 301.

By some embodiments, the above indicated condition corresponds to a point (e.g., on a performance graph of the machine learning model) where performance of the machine learning model with respect to sample size (e.g., overall sample size of the transaction data) begins to plateau. For instance, referring to FIG. 10B, there is depicted an exemplary graph 1050 illustrating performance of a machine learning model with respect to different sample sizes. The graph illustrates performance of a machine learning model (plotted on a Y-axis) against different sample sizes (plotted on the X-axis).

The performance of the machine learning model is evaluated for different sample sizes of the transaction data. For instance, as depicted in graph 1050 of FIG. 10B, point labeled 1051 (marked as solid 'X') corresponds to the performance of the machine learning model (represented as $P_1$) for a first sample size that represented as $S_1$. Similarly, points labeled 1052, 1053, 1054, 1055, 1056, and 1057 correspond to the performances of the machine learning model (represented as $P_2$ to $P_7$, respectively) for sample sizes that are represented as $S_2$-$S_7$, respectively. It is noted that the performance of the machine learning model is obtained at each sample size in an iterative manner by gradually increasing the sample size of the transaction data.

The points 1051, 1052, 1053, and 1054 that correspond to the performance ($P_1$ to $P_4$) of the machine learning model for sample sizes of $S_1$ to $S_4$ are represented by solid 'X' marks, whereas the points 1055, 1056, and 1057 that correspond to the performance ($P_5$ to $P_7$) for sample sizes of $S_5$ to $S_7$ are represented by dotted 'X' marks. It can be seen from graph 1050 that there is considerable improvement (e.g., above a predetermined threshold level of performance) in going from sample sizes $S_1$ to $S_2$, then from $S_2$ to $S_3$, and further from $S_3$ to $S_4$ and from $S_4$ to $S_5$. However, in going from sample sizes $S_5$ to $S_6$ and further from $S_6$ to $S_7$, the improvement in the performance of the machine learning model is marginal (e.g., below the predetermined threshold level of performance).

Thus, according to some embodiments, point labeled 1055 corresponds to the point where performance of the machine learning model with respect to sample size begins to plateau i.e., the performance of the machine learning model begins to achieve a steady state. In other words, improvement in performance of the machine learning model in going from sample sizes of $S_5$ to $S_6$ (corresponding to points labeled 1055 and 1056, respectively), is lower than the predetermined threshold level of performance. Thus, the gain (or improvement) in the performance of the machine learning model by increasing sample sizes beyond point labeled 1055 are marginal. This can be further confirmed by comparing the performance of the machine learning model at point 1055 to the performance of the model at point 1060 (represented as a star, and which corresponds to a full transaction data set), wherein the improvement in performance is marginal. Thus, according to some embodiments (and referring to FIG. 3), the evaluator 319 of the server computer may iteratively increase the sample size from $S_1$ to $S_5$ and determine that the sample size of $S_5$ corresponds to the optimal size of the transaction data set that produces an acceptable performance level of the machine learning model. It is appreciated that in order to determine that the sample size of $S_5$ is optimum, in some embodiments, the evaluator may increase the sample size to $S_6$ or $S_7$ for purposes of verifying (e.g., for confirmation purposes) that the performance of the machine learning model has reached the steady state.

Turning to FIGS. 4A and 4B, there is depicted different types of transactions according to some embodiments. Specifically, the different types of transactions that can be included in the transaction data (e.g., transaction data 301 of FIG. 3) may be a transaction that occurs at a user level or a transaction occurring at an account level of a user. A transaction that occurs at the user level corresponds to a real-time transaction occurring between two entities 401 and 403. For example, FIG. 4A depicts a real-time transaction occurring between two entities (i.e., user 401 and user 403). Such a transaction can be characterized by a single dimensional array 405, which includes entries corresponding to a sender, a receiver, and an amount of the transaction. Moreover, the single dimensional array may include one or more features associated with the transaction. The one or more features (e.g., feature 1, feature 2, and feature 3) may correspond to parameters (e.g., transaction velocity between the entities, an amount velocity between the entities etc.) associated with transactions between the two entities.

According to some embodiments, the transactions included in the transaction data may correspond to account level transactions as depicted in FIG. 4B. Specifically, FIG. 4B depicts transactions (e.g., incoming, and outgoing transactions) associated with an account of user 401. Such transactions are depicted in FIG. 4B as a two dimensional matrix 415. It is appreciated that each row of the two-dimensional matrix 415 is similar to the single dimensional array 405 as depicted in FIG. 4A. In other words, each row of the two dimensional matrix 415 corresponds to a single transaction associated with the account of user 401. Each row can thus be characterized by a sender, a receiver, an amount of the transaction, as well as by one or more features associated with the transaction.

Figure 5A:
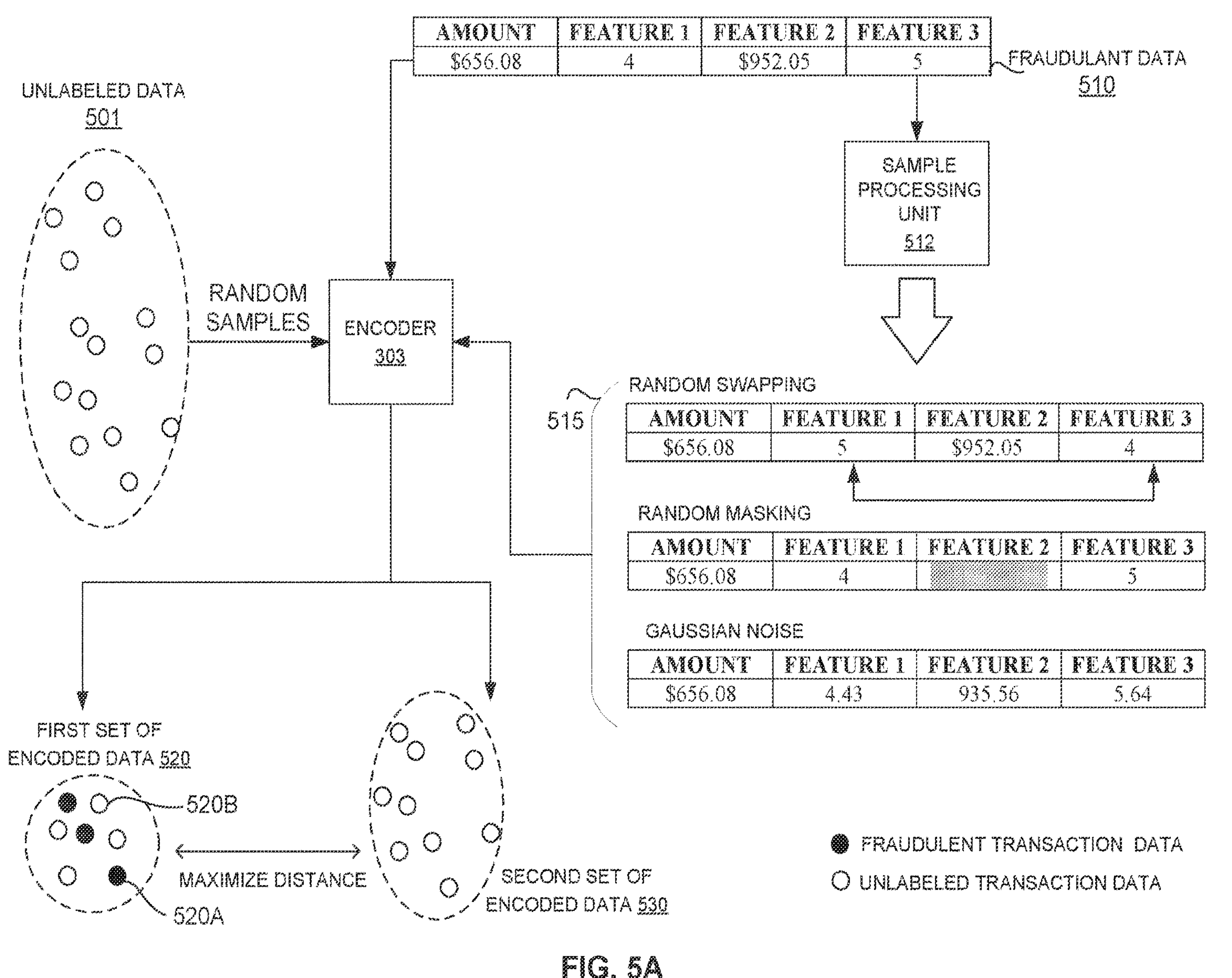
FIG. 5A depicts a schematic illustrating a process of training an encoder, according to an embodiment.

FIG. 5A depicts a schematic illustrating a process of training an encoder included in the server computer, according to an embodiment. In some implementations, the encoder included in the server computer is trained based on a contrastive learning approach. A goal of contrastive learning is to learn meaningful representations of data by training the encoder to distinguish between pairs of data points or to separate positive examples (pairs that should be similar) from negative examples (pairs that should be dissimilar).

FIG. 5A depicts a framework for training the encoder 303. The framework includes a sample processing unit 512, a fraudulent data sample 510, and unlabeled data 501. It is noted that transaction data generally may be extremely imbalanced i.e., fraudulent transactions account for a small number of occurrences (and may have different behaviors i.e., characteristics), whereas normal transactions (i.e., non-fraudulent transactions) occupy majority of the data samples and share similar behavior or characteristics. It is appreciated that fraudulent transactions are important in the training of the encoder as ignoring them may lead to the encoder being biased. As described below, the encoder 303 of the present disclosure is trained by using sampling of the normal (i.e., non-fraudulent) transactions and considering all fraudulent transactions. As such, it is anticipated that the trained encoder should be able to separate fraudulent transactions from the non-fraudulent transactions.

According to some embodiments, the encoder 303 is trained by providing it a first input of a fraudulent data sample 510. For sake of illustration the fraudulent data sample is depicted as including an amount entry (i.e., transaction amount) and three feature entries (i.e., feature 1, feature 2, and feature 3), that correspond to characteristics of the fraudulent data sample. In one implementation, the fraudulent data sample 510 is also input to the sample processing unit 512. The sample processing unit 512 performs certain operations on the fraudulent data sample 510 to generate one or more additional samples of the fraudulent data sample 510 i.e., variations of the fraudulent data sample 510. For example, the sample processing unit 512 may perform a first operation corresponding to a random swapping operation on the fraudulent data sample 510. As shown in FIG. 5A, a varied sample of the fraudulent data sample 510 may be obtained by swapping entries of feature 1 with feature 2 of the fraudulent data sample 510.

The sample processing unit 512 may perform a second operation corresponding to a masking operation, wherein a particular entry of the fraudulent data sample 510 may be masked. As shown in FIG. 5A, another varied sample of the fraudulent data sample 510 may be obtained by masking entry associated with feature 2. Additionally, the sample processing unit 512 may perform a third operation corresponding to an addition of gaussian noise on the fraudulent data sample 510. Such an operation corresponds to adding a random number (i.e., noise) to one or more entries of the fraudulent data sample 510. As shown in FIG. 5A, a gaussian noise variant of the fraudulent data sample 510 is obtained by adding noise (i.e., a small variation) to entries of feature 1 to feature 3, of the fraudulent data sample 510. The variations of the fraudulent data sample 510 generated by the sample processing unit 512 are collectively denoted as 515 in FIG. 5A. By some embodiments, each of the variations of the fraudulent data sample 510 that are generated by the sample processing unit 512 are input to the encoder 303.

Further, by one embodiment, unlabeled data 501 is randomly sampled and input to the encoder 303. The encoder 303 is configured to map each input in a vector space. For instance, the encoder encodes each input as an N-dimensional vector (e.g., N=5 dimensions) in the vector space. By one embodiment, the output of the encoder 303 is a first set of encoded data 520 and a second set of encoded data 530. The first set of encoded data 520 includes all fraudulent data samples (e.g., fraudulent data sample/point labeled 520A) and one or more unlabeled data samples/points e.g., unlabeled data point 520B. The one or more unlabeled data points included in the first set of encoded data 520 are referred to herein as unlabeled data points (corresponding to unlabeled transactions) that are similar to fraudulent transactions. An unlabeled data point (e.g., sample 520B) is determined to be similar to the fraudulent data points based on the unlabeled data point (corresponding to an unlabeled transaction) being within a predetermined distance of the encoded plurality of fraudulent data points (corresponding to fraudulent transactions) in the vector space. In other words, the unlabeled data point e.g., sample 520B is similar in behavior (i.e., has the same characteristics) to the fraudulent data samples included in the first set of encoded data 520. The second set of encoded data 530 includes other unlabeled data samples that are dissimilar to the fraudulent data samples. In this manner, the encoder generates the two sets of encoded data 520 and 530 respectively, such that a distance between the two sets (e.g., distance measured from a center (mean) of the two sets) is maximized.

Figure 5B:
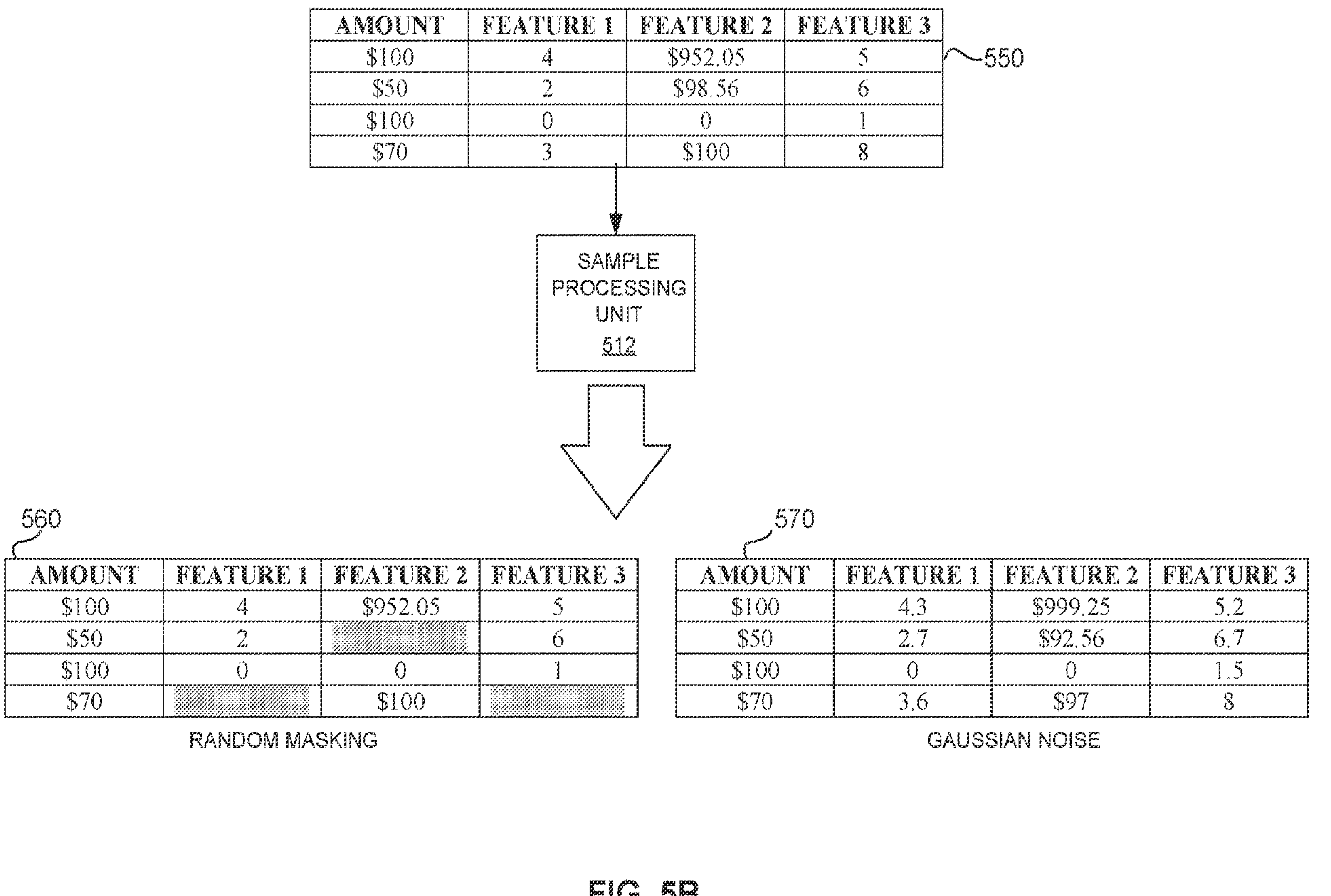
FIG. 5B illustrates schematically operations performed on a certain type of transaction according to an embodiment.

As described next, the first set of encoded data 520 is input to a first sampling module of the server computer. The first sampling module performs or executes a first sampling process with respect to the first set of encoded data 520. On the other hand, the second set of encoded data is input to a second sampling module of the server computer. The second sampling module performs or executes a second sampling process (different than the first sampling process) with respect to the second set of encoded data 530. Furthermore, it is appreciated that in the above described operations performed by the sample processing unit 512 (e.g., random swapping, masking, gaussian noise, etc.,) are meant to be illustrative and are in no manner limiting the scope of the present disclosure. Rather, the sample processing unit may perform any number of different operations to generate variations of the fraudulent data sample 510. Similarly, although the fraudulent data sample 510 that is utilized for training the encoder is depicted as a single dimensional array, it is appreciated that two-dimensional fraudulent data sample 550 (as shown in FIG. 5B) may be equally applicable for training the encoder. In such a scenario, the sample processing unit 512 may perform similar operations (e.g., random masking, addition of gaussian noise, etc.,) on the fraudulent data sample 550 to generate one or more of its variants e.g., sample denoted as 560 and 570 in FIG. 5B.

Figure 6:
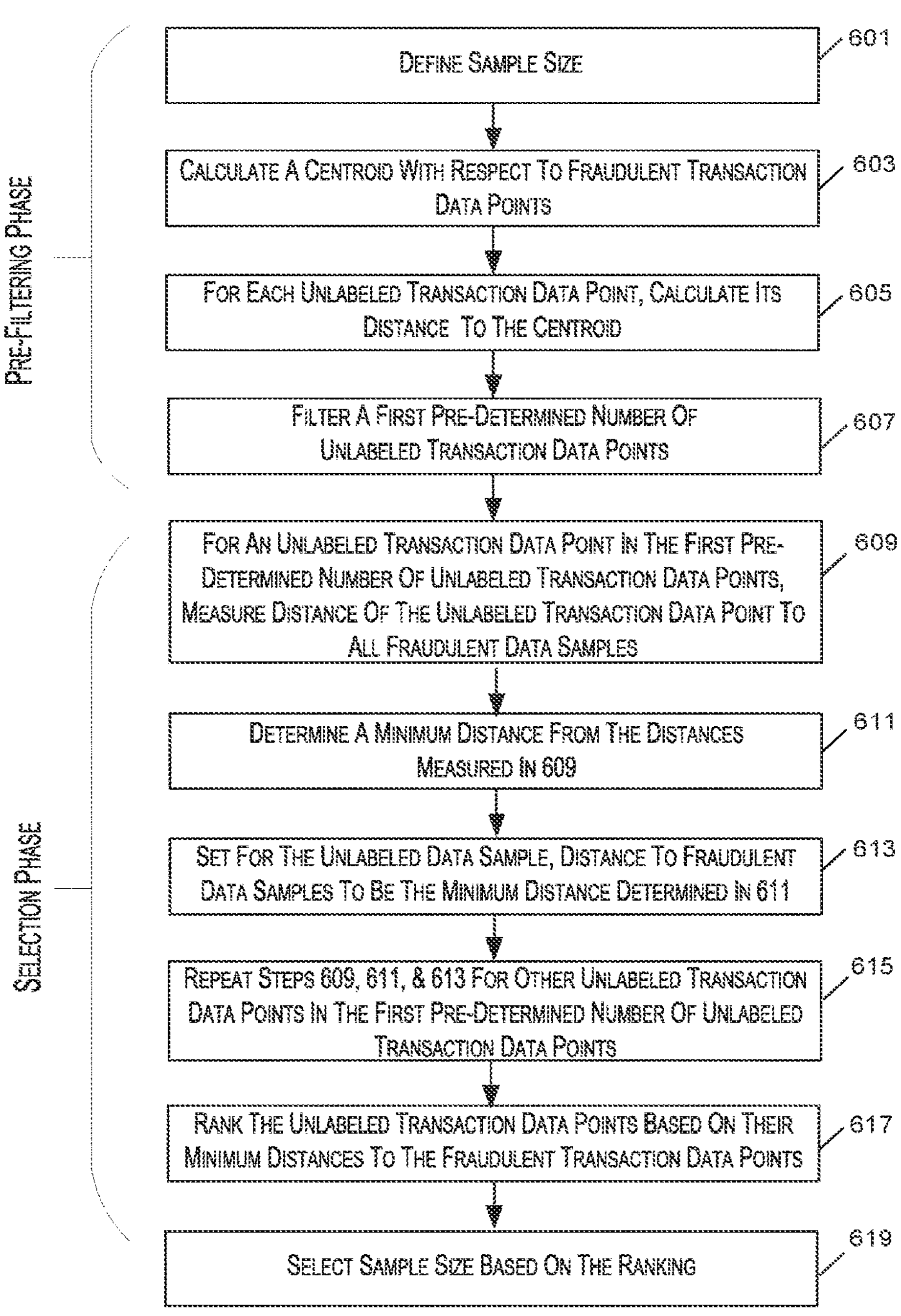
FIG. 6 depicts an exemplary flowchart illustrating steps of a process (e.g., a first sampling process) performed by a server computer, according to an embodiment.

FIG. 6 depicts an exemplary flowchart illustrating steps of a process (e.g., a first sampling process) performed by a server computer, according to an embodiment. Specifically, the flowchart of FIG. 6 corresponds to the steps performed by the first sampling module 309 included in the server computer. The first sampling module performs a first sampling process (referred to herein as a 'hard-negative' sampling process) with respect to the first set of encoded data that is output by the encoder. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order, or some steps may also be performed in parallel.

Figure 7B:
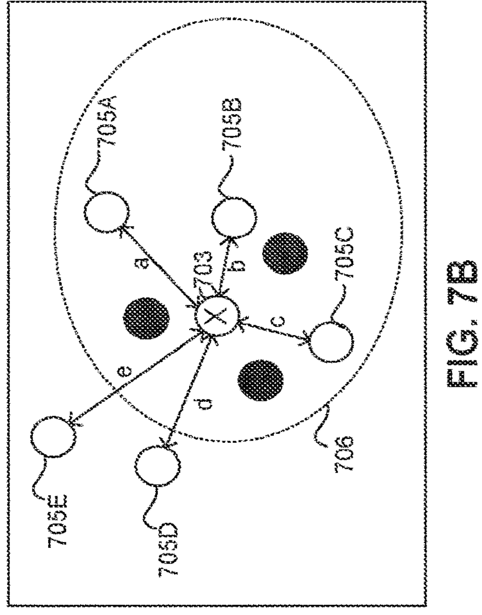
FIGS. 7A, 7B, and 7C illustrate schematically certain steps of the first sampling process performed by the server computer, according to an embodiment.
Figure 7C:
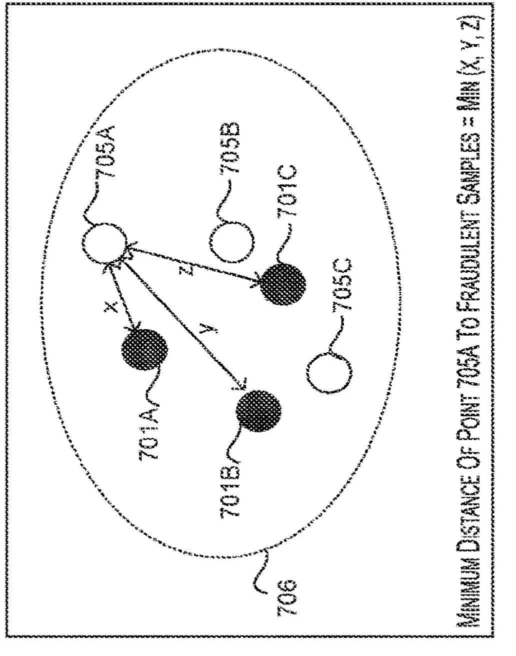
Figure 7A:

It is noted that the first set of encoded data includes data points (e.g., fraudulent transaction data points) that correspond to fraudulent transactions as well as data points e.g., unlabeled transaction data points that are determined to be similar to fraudulent transactions. A goal of the first sampling process is to select (i.e., sample) one or more data points from the set of unlabeled transaction data points that are similar to the fraudulent transaction data points (i.e., known hard negative data points). In some embodiments, upon the first sampling module performing the first sampling process with respect to the first set of encoded data, it generates a first sampled set of encoded data, which includes one or more unlabeled transaction data points (deemed to be similar to the fraudulent transaction data points) and all of the fraudulent transaction data points. The process as depicted in FIG. 6 includes two phases: (a) a pre-filtering phase corresponding to steps 601 to 607 in FIG. 6, and (b) a selection phase corresponding to steps 609 to 619 in FIG. 6. Further, for sake of clarity, FIGS. 7A, 7B, and 7C illustrate schematically certain steps of the first sampling process performed by the first sampling module, according to some embodiments.

The pre-filtering phase commences in step 601, where a sample size is defined. The sample size corresponds to a number of samples that are to be extracted from the first set of encoded data per iteration of the process of FIG. 6. For instance, a sample size of $K_{sample\text{-}size}=2$ may be defined in this step. The process in step 603 computes a centroid with respect to fraudulent transaction data points included in the first set of encoded data i.e., the input set. It is noted that a centroid is a central point or an arithmetic mean position of a set of data points in a multi-dimensional space i.e., the vector space. As shown in FIG. 7A, for the fraudulent transaction data points 701A, 701B, and 701C, the centroid 703 is computed.

The process then moves to step 605, where for each unlabeled transaction data point included in the input set, its distance to the centroid (computed in step 603) is calculated. For instance, as shown in FIG. 7B, for the unlabeled transaction data points 705A, 705B, 705C, 705D, and 705E, their respective distances to centroid 703 represented as 'a', 'b', 'c', 'd', and 'e' are calculated. The process in step 607 filters a first pre-determined number of unlabeled transaction data points based on their computed distances in step 605. For example, a first pre-determined number (e.g., $N=50*K_{sample\text{-}size}$) that are closest to the centroid may be filtered out. As shown in FIG. 7B, the unlabeled transaction data points 705A, 705B, 705C are filtered out, and the other unlabeled transaction data points 705D and 705E are excluded/discarded from further consideration as they correspond to points that are far away from the centroid e.g., more than a threshold distance. In this example, the unlabeled transaction data points 705A, 705B, 705C (shown enclosed in dotted ellipse 706) correspond to the first pre-determined number of unlabeled transaction data points.

The process then proceeds with the selection phase commencing in step 609. In step 609, for an unlabeled transaction data point that is included in the first pre-determined number of unlabeled transaction data points (from step 607), distances of the unlabeled transaction data point is measured to each fraudulent transaction data point. For example, referring to FIG. 7C, it is seen that unlabeled transaction data points 705A, 705B, and 705C were included in the first pre-determined number of unlabeled transaction data points (determined in step 607). Considering a particular unlabeled transaction data point as an example, say point 705A, in FIG. 7C, there is depicted a scenario illustrating distances of the point 705A computed to each fraudulent transaction data point (i.e., points 701A, 701B, and 701C). The measured distances of point 705A to the fraudulent transaction data points is labeled as 'x', 'y', and 'z', respectively in FIG. 7C.

In step 611, for the unlabeled transaction data point (e.g., 705A), based on the distances computed in step 609, a minimum distance is determined. For example, considering the unlabeled transaction data point 705A, the minimum distance associated with this point is computed as: minimum (x, y, z). Further, in step 613, for the unlabeled transaction data point, its distance to the fraudulent transaction data points is set to be the minimum distance that is associated with this point (computed in step 611). Such a distance is referred to herein as the separation distance of the unlabeled transaction data point from fraudulent transaction data points. In step 615, the steps of 609, 611, and 613 are repeated for the other unlabeled transaction data points included in the first predetermined number of unlabeled transaction data points (e.g., points 705B and 705C).

The process then moves to step 617, where a rank is assigned for each unlabeled transaction data point included in the first predetermined number of unlabeled transaction data points. It is appreciated that the rank may be assigned based on an ascending (i.e., increasing) order of the minimum distance of the respective unlabeled transaction data point to the fraudulent transaction data points. The ranking of the unlabeled transaction data points forms a set of ranked unlabeled transaction data points. In step 619, a first N number of unlabeled transaction data points are selected from the set of ranked unlabeled transaction data points, where the parameter $N=K_{sample\text{-}size}$ i.e., sample size defined in step 601. In this manner, according to one embodiment, the closest N unlabeled transaction data points are sampled by the first sampling module of the server computer.

Figure 8:
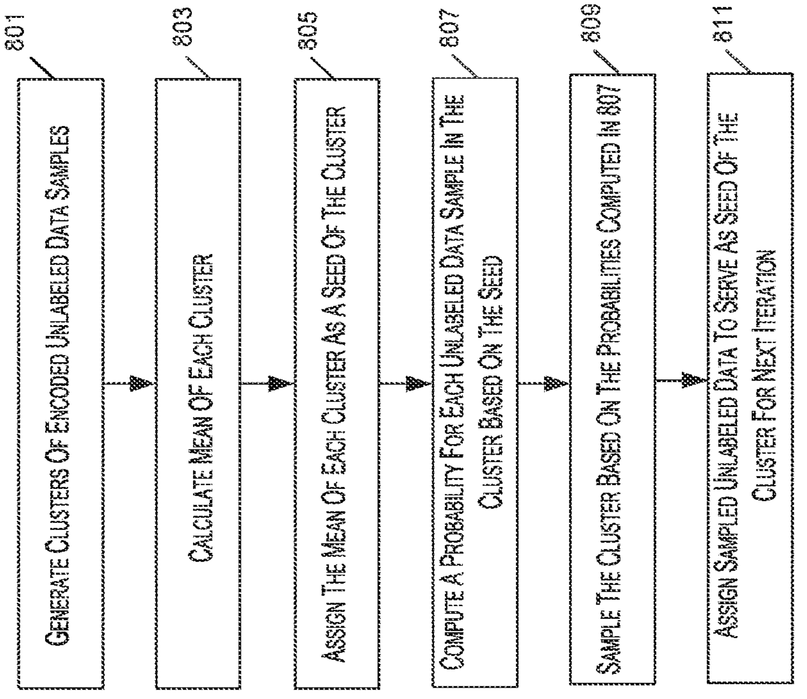
FIG. 8 depicts an exemplary flowchart illustrating steps of another process (e.g., a second sampling process) performed by the server computer, according to an embodiment.

FIG. 8 depicts an exemplary flowchart illustrating steps of another process (e.g., a second sampling process) performed by the server computer, according to an embodiment. Specifically, the flowchart of FIG. 8 corresponds to the steps performed by the second sampling module 311 included in the server computer. The second sampling module performs a second sampling process (referred to herein as a 'diversity' sampling process) with respect to the second set of encoded data that is output by the encoder. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order, or some steps may also be performed in parallel.

Figure 9:
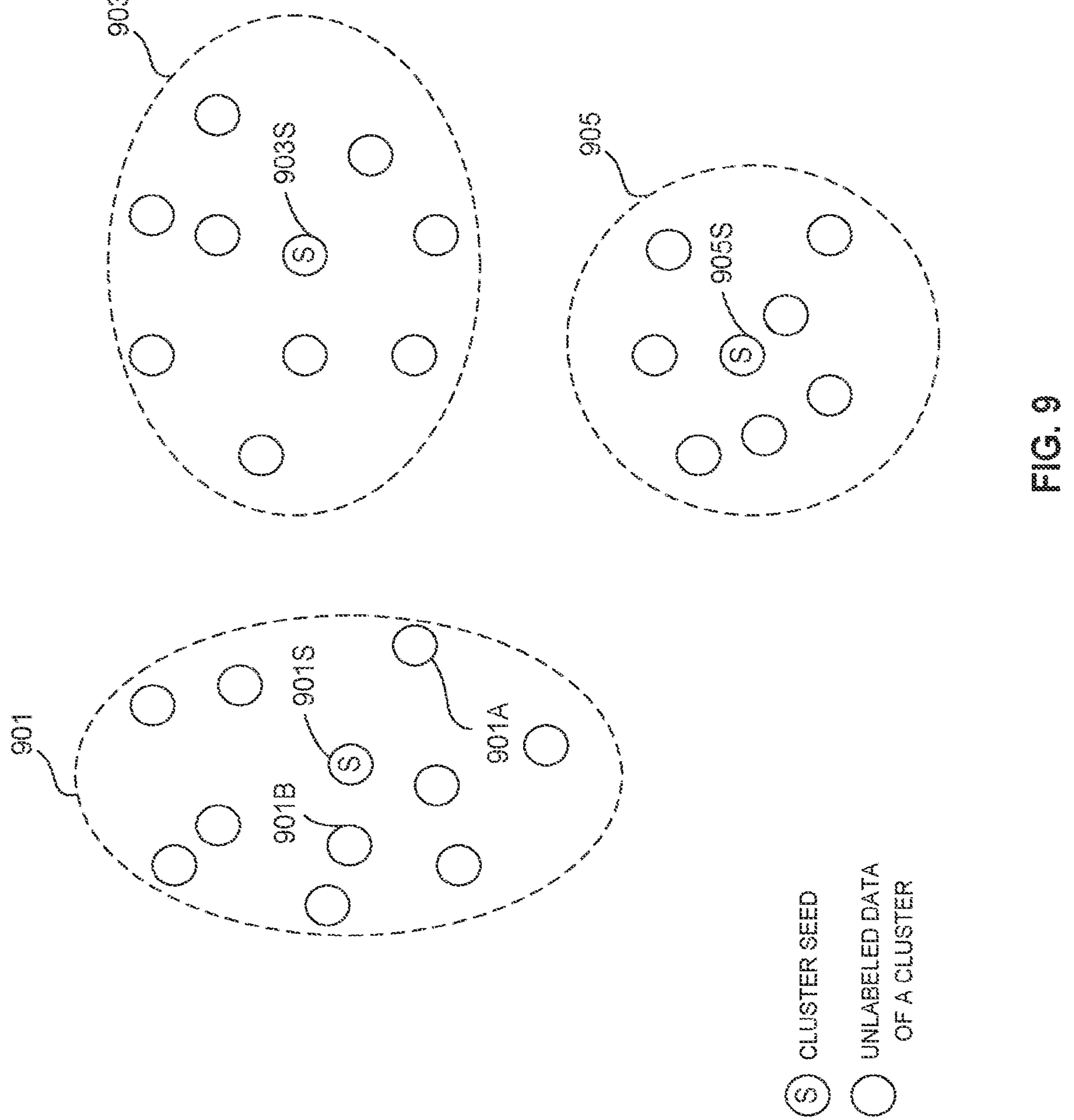
FIG. 9 illustrates schematically steps of the second sampling process performed by the server computer, according to an embodiment.

It is noted that the second set of encoded data includes unlabeled data points, which correspond to non-fraudulent transactions. A goal of the second sampling process is to cover a variety of samples from different clusters, where each cluster is characterized by a unique behavior e.g., high transaction amount, high velocity, etc. In other words, unlabeled data points belonging to a particular cluster share a same characteristic (i.e., behavior). In some embodiments, upon the second sampling module performing the second sampling process with respect to the second set of encoded data, generates a second sampled set of encoded data, which includes one or more unlabeled data points. Further, for sake of clarity, FIG. 9 illustrates schematically certain steps of the second sampling process performed by the second sampling module, according to some embodiments.

The process commences in step 801, where the second sampling module generates clusters of encoded unlabeled data samples i.e., unlabeled transaction data points. It is noted that the different clusters may be generated based on characteristics associated with the unlabeled transaction data points. For example, as shown in FIG. 9, one may generate three clusters 901, 903, and 905, each of which is associated with a particular characteristic i.e., the unlabeled transaction data points included in a particular cluster share a same characteristic (e.g., high velocity, high transaction amount, etc.). In step 803, for each cluster generated in step 801, a mean of the cluster is computed. Further, in step 805, the computed mean (of step 803) is designated as a seed of the cluster (i.e., seed data point of the cluster). For example, referring to FIG. 9, with respect to cluster 901, a mean of the cluster 901S is designated as the seed of that cluster. Similarly, for clusters 903 and 905, their respective means i.e., 903S and 905S are designated as the respective seeds of the clusters.

According to some embodiments, the seed of each cluster is used as a starting point for performing sampling with respect to that cluster. Specifically, for each unlabeled transaction data point in a cluster, a probability is computed based on a distance of the unlabeled transaction data point from the seed of the cluster. The probability $P(x_i)$ for an unlabeled transaction data point $x_i$ can be computed as follows:

$$P(x_i) = \frac{D(x_i, s)}{\sum_{j \in cluster} D(x_j, s)}$$

where, $D(x_i, s)$ is the distance of the unlabeled transaction data point $x_i$ from the seed(s) of the cluster, and the variable j iterates over all unlabeled transaction data points included in the cluster. In other words, the probability $P(x_i)$ for the unlabeled transaction data point $x_i$ is computed as a ratio of a distance of the unlabeled transaction data point to the seed of the cluster to a sum of respective distances of other unlabeled transaction data points in the cluster to the seed of the cluster. Thus, according to the equation stated above, for a particular cluster (e.g., cluster 901 of FIG. 9), a first unlabeled transaction data point (e.g., 901A) that is located further away from the seed of the cluster (901S), as compared to a second unlabeled transaction data point (e.g., 901B), has a higher probability of being sampled from the cluster.

The process in step 809 proceeds to sample, from each cluster, one or more unlabeled transaction data points based on the probabilities computed in step 807. In some implementations, a pre-determined sample size ($B_{sample\text{-}size}$) may be defined for each cluster e.g., $B_{sample\text{-}size}=1$. Thus, in step 809, $B_{sample\text{-}size}$ number of unlabeled transaction data point(s) may be selected. Further, the process moves to step 811, wherein for each cluster, the sampled unlabeled transaction data point of the cluster is designated to operate as the seed of the cluster in the next round of iteration of the second sampling process. It is appreciated that in the above described process of sampling for unlabeled transaction data points from a particular clusters, duplicative samples may be ignored.

Figure 10A:
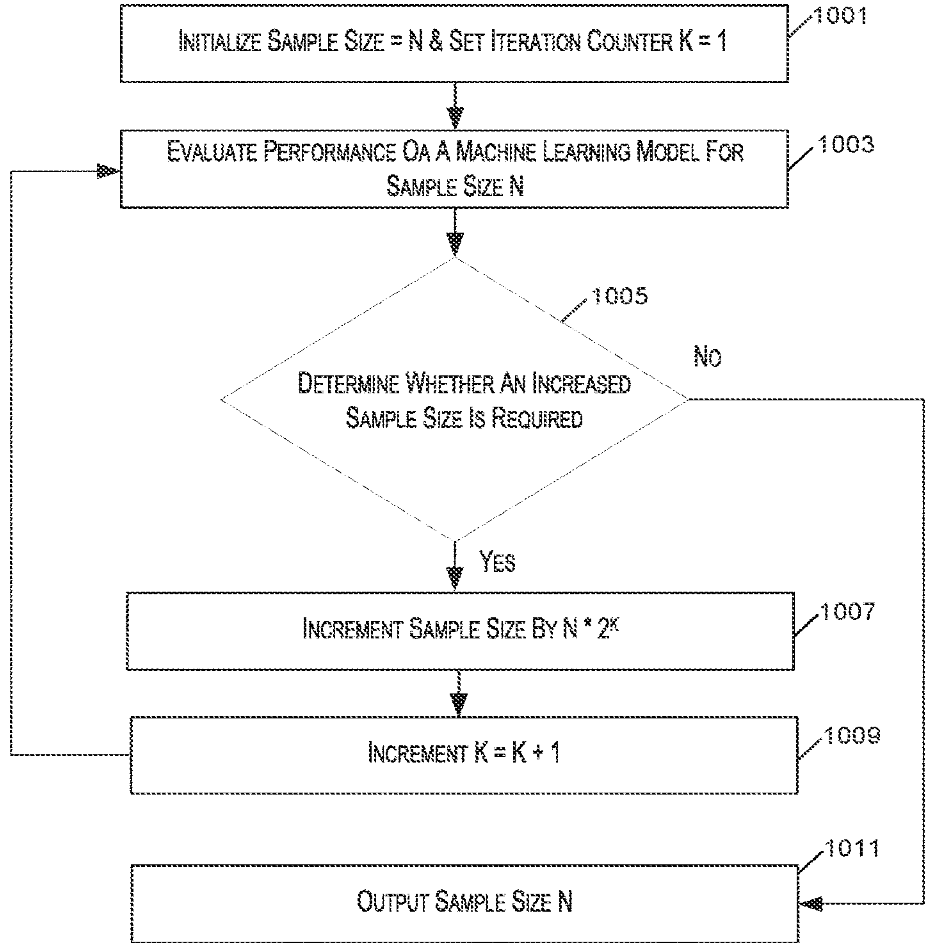
FIG. 10A depicts an exemplary flowchart illustrating steps of an evaluation process that is executed to determine an optimum sample size (of input data) for a machine learning model, according to an embodiment.
Figure 10B:
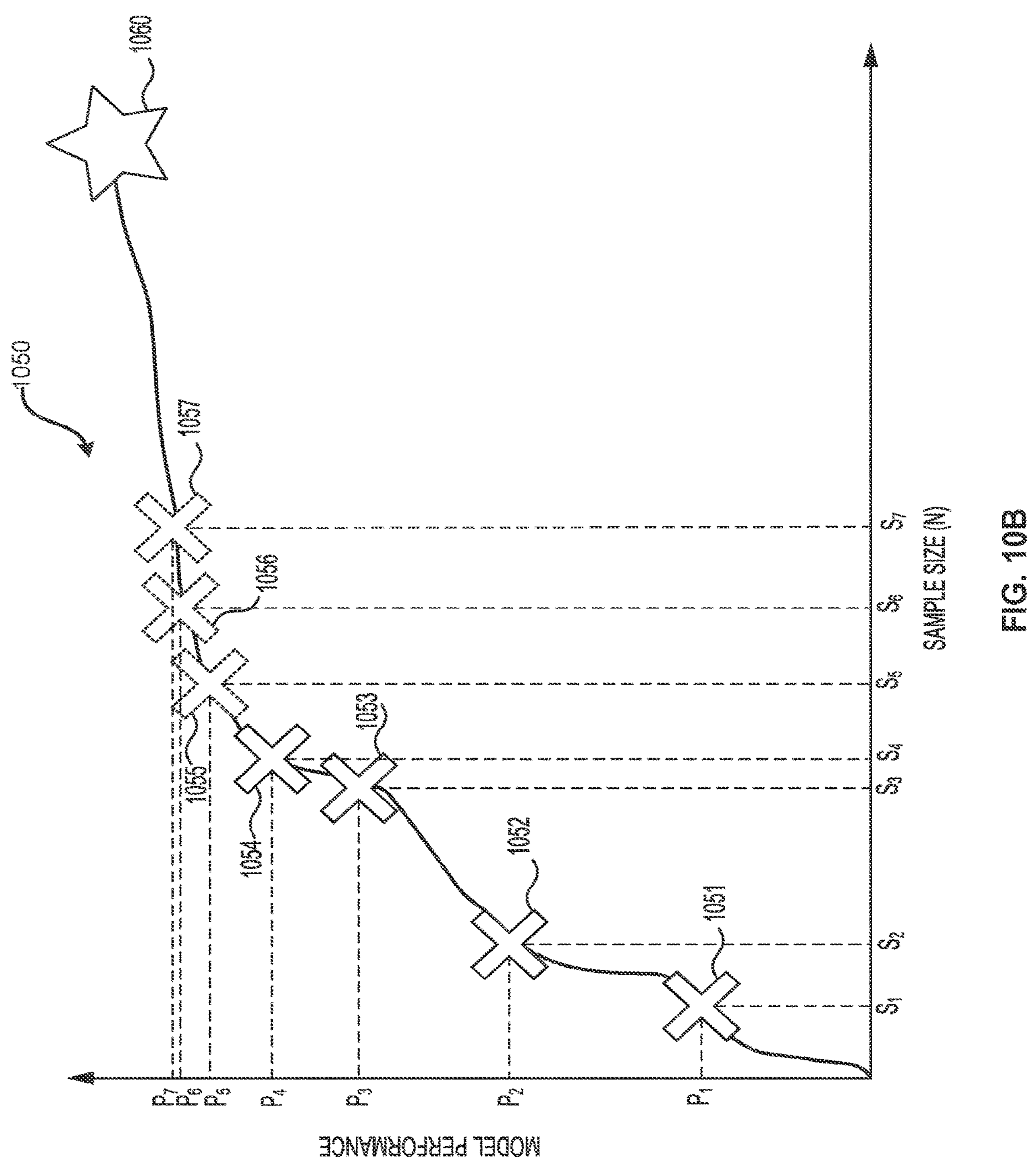
FIG. 10B depicts an exemplary graph illustrating performance of a machine learning model with respect to different sample sizes.

FIG. 10A depicts an exemplary flowchart illustrating steps of an evaluation process that is executed to determine an optimum sample size for a machine learning model, according to an embodiment. The processing depicted in FIG. 10B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 10B and described below is intended to be illustrative and non-limiting. Although FIG. 10B depicts the various processing steps occurring in a particular sequence or order, this is not intended to be limiting. In certain alternative embodiments, the steps may be performed in some different order, or some steps may also be performed in parallel.

The process commences in step 1001, where an initial value of a sample size (N) is determined. For instance, the value of the sample size may be set to N=10×C, where C corresponds to the number of clusters in the encoded data set e.g., in the first set of encoded data 305 and the second set of encoded data 307 of FIG. 3. Further, in step 1001, a value of an iterative counter (K) is initialized to 1. In step 1003, the process evaluates the performance of the machine learning model for the sample size of N.

In step 1005, a query is executed to determine whether an increased sample size is required. Note that as described previously with reference to FIG. 3 and FIG. 10B, such a determination may be performed based on verifying whether the performance of the machine learning model has reached a steady state. If the response to the query is affirmative (i.e., an increase in sample size is required) then the process moves to step 1007. However, if the response to the query is negative (i.e., an increase in sample size is not required), then the process moves to step 1011, where the value of the sample size (N) is output as the optimum sample size.

The process in step 1007 proceeds to increase the sample size (N). In some implementations, the sample size may be increased by a value of $N \times 2^K$. In step 1009, the value of the iterative counter (K) is incremented by one, whereafter the process loops back to step 1003 to perform the next iteration of sampling by the first sampling module and the second sampling module. It is appreciated that by one embodiment, the increased number of samples (i.e., $N \times 2^K$) that are to be obtained from the clusters of the first set of encoded data and the second set of encoded data may be obtained in a uniform manner. However, this is in no way limiting the scope of the present disclosure. Rather, other mechanisms of determining how many samples (e.g., a weighted approach) are to obtained from the first sampling module and the second sampling module may also be applied.

Embodiments of the present disclosure have provided for an encoding framework that distinguishes between different transaction behaviors. Features of the present disclosure also provide for two different sampling techniques i.e., hard-negative sampling technique and a diversity sampling technique that each operate on different sets of encoded data that are obtained from the encoder. The encoding and sampling frameworks provided here have a number of advantages. For instance, a reduction in the size of training data that is used to train a machine learning model is achieved. Such a reduction in the size of training data (without significantly compromising on the performance of the model) provides advantages such as a reduction in a total storage space that is required to store data, and a reduction in computing resources. Further, as stated previously collecting, cleaning, and labeling a large dataset can be expensive and time-consuming. Thus, with a reduction in the size of training data by aspects of the present disclosure also provides for means for training machine learning models in an economically feasible manner.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method for determining an optimal size of a training dataset for training a machine learning model to detect fraudulent transactions, the method comprising:

encoding, by a server computer, transaction data comprising unlabeled transaction data and fraudulent transaction data to generate encoded transaction data comprising: (i) a first set of encoded data associated with fraudulent transactions and unlabeled transactions that are similar to fraudulent transactions, and (ii) a second set of encoded data associated with unlabeled transactions, wherein the encoding is performed by an encoder trained to separate positive transaction data samples of the first set of encoded data from negative transaction data samples of the second set of encoded data and wherein the encoder receives transaction data from an imbalanced data set;

performing, by the server computer, a first sampling process with respect to the first set of encoded data to obtain a first sampled set of encoded data;

performing, by the server computer, a second sampling process with respect to the second set of encoded data to obtain a second sampled set of encoded data, wherein the second sampling process is different from the first sampling process and includes: (i) generating, a plurality of clusters of unlabeled transaction data points from the second set of encoded data, (ii) determining a seed point for each of the plurality of clusters, and (iii) computing, for each unlabeled transaction data point included in a cluster, a probability corresponding to the unlabeled transaction data point being sampled from the cluster, wherein a first unlabeled transaction data point that is located further away from the seed point as compared to a second unlabeled transaction data point is associated with a higher probability of being selected from the cluster than the second unlabeled transaction data point;

merging, by the server computer, the first sampled set of encoded data with the second sampled set of encoded data to generate a concatenated training data set for training the machine learning model;

evaluating, by the server computer, a performance of the machine learning model that classifies the concatenated training data set;

responsive to the performance of the machine learning model not satisfying a condition, increasing, by the server computer, a size of the concatenated training data set by iteratively repeating the first sampling process and the second sampling process to increase a size of the first sampled set of encoded data and the second sampled set of encoded data to generate a larger concatenated training data set;

re-evaluating, by the server computer, the performance of the machine learning model until the condition is satisfied, wherein the condition corresponds to determining whether the performance of the machine learning model has plateaued, wherein the size of the larger concatenated training data set is an optimized size; and responsive to the performance of the machine learning model plateauing, training the machine learning model using the concatenated training data set to detect fraudulent transactions.

2. The method of claim 1, wherein the unlabeled transaction data includes a first plurality of unlabeled transaction data points and a second plurality of unlabeled transaction data points, and the fraudulent transaction data includes a third plurality of fraudulent transaction data points, and wherein each of the first plurality of unlabeled transaction data points, the second plurality of unlabeled transaction data points, and the third plurality of fraudulent transaction data points is encoded as an N-dimensional vector in a vector space.

3. The method of claim 2, wherein the first plurality of unlabeled transaction data points and the third plurality of fraudulent transaction data points are encoded to be included in the first set of encoded data, and wherein the second plurality of unlabeled transaction data points are encoded to be included in the second set of encoded data.

4. The method of claim 2, wherein a first unlabeled transaction is determined to be similar to fraudulent transactions based on a first encoded unlabeled transaction data point corresponding to the first unlabeled transaction being within a predetermined distance of encoded second plurality of fraudulent transaction data points in the vector space.

5. The method of claim 2, wherein the first sampling process comprises:

computing, by the server computer, a centroid with respect to the third plurality of fraudulent transaction data points;

for each unlabeled transaction data point included in the first plurality of unlabeled transaction data points, calculating, a first distance of the unlabeled transaction data point to the centroid; and generating a set of unlabeled transaction data points by filtering the first plurality of unlabeled transaction data points based on their respective first distances to the centroid.

6. The method of claim 5, further comprising:

for each unlabeled transaction data point included in the set of unlabeled transaction data points calculating, a second distance of the unlabeled transaction data point to each fraudulent data point included in the third plurality of fraudulent transaction data points;

determining a minimum distance from respective second distances associated with the unlabeled transaction data point; and setting for the unlabeled transaction data point, the minimum distance as a separation distance of the unlabeled transaction data point from the third plurality of fraudulent transaction data points.

7. The method of claim 6, further comprising:

assigning, for each unlabeled transaction data point included in the set of unlabeled transaction data points, a rank based on the separation distance of the unlabeled transaction data point; and sampling, from the first sampled set of encoded data, a first sample size of unlabeled transaction data points based on the assigning.

8. The method of claim 3, wherein, the seed point corresponds to a mean of the unlabeled transaction data points in the cluster, and wherein the cluster is sampled based on the seed point.

9. The method of claim 1, wherein the probability associated with the unlabeled transaction data point is computed as a ratio of a third distance of the unlabeled transaction data point to the seed point of the cluster to a sum of respective distances of other unlabeled transaction data points in the cluster to the seed point of the cluster.

10. The method of claim 1, wherein the first sampling process is different than the second sampling process.

11. A server computer comprising:

a processor; and a non-transitory computer readable medium coupled to the processor and comprising code, executable by the processor, for implementing a method for determining an optimal size of a training dataset for training a machine learning model to detect fraudulent transactions, the method comprising encoding, by the server computer, transaction data comprising unlabeled transaction data and fraudulent transaction data to generate encoded transaction data comprising: (i) a first set of encoded data associated with fraudulent transactions and unlabeled transactions that are similar to fraudulent transactions, and (ii) a second set of encoded data associated with unlabeled transactions, wherein the encoding is performed by an encoder trained to separate positive transaction data samples of the first set of encoded data from negative transaction data samples of the second set of encoded data and wherein the encoder receives transaction data from an imbalanced data set;

performing, by the server computer, a first sampling process with respect to the first set of encoded data to obtain a first sampled set of encoded data;

performing, by the server computer, a second sampling process with respect to the second set of encoded data to obtain a second sampled set of encoded data, wherein the second sampling process is different from the first sampling process and includes: (i) generating, a plurality of clusters of unlabeled transaction data points from the second set of encoded data, (ii) determining a seed point for each of the plurality of clusters, and (iii) computing, for each unlabeled transaction data point included in a cluster, a probability corresponding to the unlabeled transaction data point being sampled from the cluster, wherein a first unlabeled transaction data point that is located further away from the seed point as compared to a second unlabeled transaction data point is associated with a higher probability of being selected from the cluster than the second unlabeled transaction data point;

merging, by the server computer, the first sampled set of encoded data with the second sampled set of encoded data to generate a concatenated training data set for training the machine learning model;

evaluating, by the server computer, a performance of the machine learning model that classifies the concatenated training data set;

responsive to the performance of the machine learning model not satisfying a condition, increasing, by the server computer, a size of the concatenated training data set by iteratively repeating the first sampling process and the second sampling process to increase a size of the first sampled set of encoded data and the second sampled set of encoded data to generate a larger concatenated training data set;

re-evaluating, by the server computer, the performance of the machine learning model until the condition is satisfied, wherein the condition corresponds to determining whether the performance of the machine learning model has plateaued, wherein the size of the larger concatenated training data set is an optimized size; and responsive to the performance of the machine learning model plateauing, training the machine learning model using the concatenated training data set to detect fraudulent transactions.

12. The server computer of claim 11, wherein the unlabeled transaction data includes a first plurality of unlabeled transaction data points and a second plurality of unlabeled transaction data points, and the fraudulent transaction data includes a third plurality of fraudulent transaction data points, and wherein each of the first plurality of unlabeled transaction data points, the second plurality of unlabeled transaction data points and the third plurality of fraudulent transaction data points is encoded as an N-dimensional vector in a vector space.

13. The server computer of claim 12, wherein the first plurality of unlabeled transaction data points and the third plurality of fraudulent transaction data points are encoded to be included in the first set of encoded data, and wherein the second plurality of unlabeled transaction data points are encoded to be included in the second set of encoded data.

14. The server computer of claim 12, wherein a first unlabeled transaction is determined to be similar to fraudulent transactions based on a first encoded unlabeled transaction data point corresponding to the first unlabeled transaction being within a predetermined distance of encoded second plurality of fraudulent transaction data points in the vector space.

15. The server computer of claim 12, wherein the first sampling process comprises:

computing, by the server computer, a centroid with respect to the third plurality of fraudulent transaction data points;

for each unlabeled transaction data point included in the first plurality of unlabeled transaction data points, calculating, a first distance of the unlabeled transaction data point to the centroid; and generating a set of unlabeled transaction data points by filtering the first plurality of unlabeled transaction data points based on their respective first distances to the centroid.

16. The server computer of claim 15, further comprising:

for each unlabeled transaction data point included in the set of unlabeled transaction data points calculating, a second distance of the unlabeled transaction data point to each fraudulent data point included in the third plurality of fraudulent transaction data points;

determining a minimum distance from respective second distances associated with the unlabeled transaction data point; and setting for the unlabeled transaction data point, the minimum distance as a separation distance of the unlabeled transaction data point from the third plurality of fraudulent transaction data points.

* * * * *